Jan. 19, 1954  A. F. DOOLEY  2,666,535
SORTING SYSTEM
Filed Aug. 20, 1949  8 Sheets-Sheet 1

Inventor
by Arthur F. Dooley
Kenway, Jenney, Witter & Hildreth
Attys.

Jan. 19, 1954  A. F. DOOLEY  2,666,535
SORTING SYSTEM
Filed Aug. 20, 1949  8 Sheets-Sheet 2

Inventor
by Arthur F. Dooley
Kenway, Jenney, Witter & Hildreth
Attys.

Patented Jan. 19, 1954

2,666,535

UNITED STATES PATENT OFFICE 2,666,535

SORTING SYSTEM

Arthur F. Dooley, Salem, Mass., assignor to Jordan Marsh Company, Boston, Mass., a corporation of Massachusetts Application August 20, 1949, Serial No. 111,471

4 Claims. (Cl. 214—11)

My invention relates to sorting and encompasses a conveyor system equipped to discharge selected objects at predetermined stations in accordance with a code or pre-arranged plan.

Although the system of my invention is capable of use in a wide variety of industrial environments, I shall describe it as it is employed to sort retail store packages into various delivery zone groups.

In large stores it is customary to send wrapped packages into a delivery room upon a long conveyor belt along which stand a number of sorters whose duty it is to read the addresses or route code numbers on the packages and remove them from the belt at stations representing the different routes followed by the delivery trucks. It will be seen that the sorter at the first station must scan 100% of the packages in order to pick out those few bearing addresses in his zone. The last sorter theoretically has only to remove all packages arriving at his station, although in practice packages for other stations reach him as the result of errors of the previous sorters. Such a system requires a large number of persons for work of the most tedious kind.

The most important object of my invention is to provide a practical automatic sorting conveyor.

Another object of the invention is to reduce the cost of delivering merchandise by eliminating non-productive man hours wasted by sorters in scanning packages not pertinent to their activity.

Another object of the invention is to increase the speed and efficiency with which large numbers of objects may be separated into discrete groups or classes.

An important feature of my invention resides in the combination of a conveyor belt having a series of groups of holes, a plurality of means for removing objects from the belt, and actuating fingers mounted beneath the belt in spaced laterally offset relation, each actuating finger being effective to operate one of said object-removing means in response to excitation by a ball dropped through one of the holes in the belt. A plate supports the upper run of the belt and is provided with holes over each of the actuating fingers. The result is that a sorter at the head of the belt may scan the addresses of the incoming packages and then drop a ball into that one of the group of holes by the package which will ride over the desired finger. The ball then rides in the belt hole and upon the plate until it drops through the hole in the plate, operates the actuating finger and effects removal of the package at the pre-selected station.

These and other objects and features of the invention will be best understood and appreciated from the following detailed description of preferred embodiments selected for purposes of illustration and shown in the accompanying drawings, in which:

Fig. 14 is a view in cross-section along the line 14—14 of Fig. 13.

Before proceeding to a detailed description of the several parts, I shall first discuss in general the organization of the important instrumentalities and functions of the system of my invention. For this purpose reference may be made to Fig. 16 wherein a complete unit is shown assembled about a long conveyor belt 200 mounted to run through a long straight reach across an elongated supporting plate 202. At one side of the belt is a succession of roller chutes 204, 206 and 208, while small delivery rooms, or bins, are shown at 210, 212 and 214. Poised over the conveyor belt 200 and suspended at intervals from the ceiling is a plurality of pairs of inclined tracks 220, each track containing an endless chain driven by a power unit 222 carrying four sweeps or paddles 228, the arrangement being such that each sweep will operate to push packages from the belt into one of the roller chutes.

At desirable intervals the belt 200 is provided with a group of transversely aligned holes 240. Just ahead of each sweep path is a hole through the plate 202 aligned longitudinally with one of the holes 240 in the belt. Beneath each hole in the plate is a tube 50 (Figs. 4 and 5) into which extends the actuating finger 62 of a microswitch 60 connected to control the appropriate drive unit 222 for that station. The drive unit, on one closing of the microswitch 60, is arranged to move one sweep 228 transversely across the belt 200 and then stop.

If a ball is dropped into one of the holes 240 it will be carried along over the surface of the plate 202 until it reaches a hole in the plate, drops into a tube 50 and actuates the switch finger 62. The sweep will then act to deflect a package from the belt into one of the roller chutes 204, 206 and 208. Periodically an attendant removes packages from the chutes and stacks them in the appropriate delivery rooms. It will be noted that by this arrangement the speed of the belt is obviated as a factor; no problem of timing is presented. Each object or package to be sorted carries right with it a key, as it were, to effect its discharge at the proper location.

Coming now to the details of the preferred embodiments illustrated, I shall first discuss the mechanism for loading the balls into the selected holes.

Figures 1, 2, 3, 4, 5:
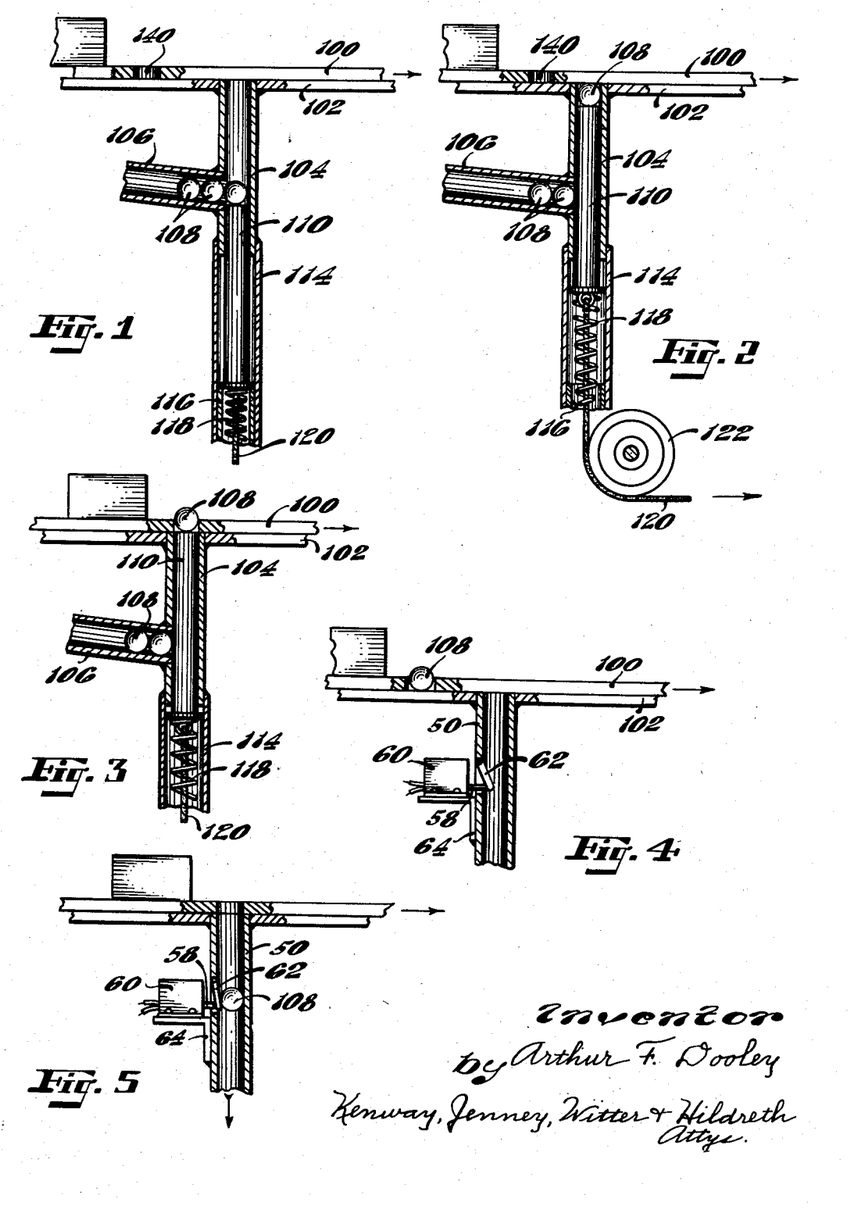
Figs. 1-3 are views in vertical cross-section through a ball-loading device associated with a conveyor belt.
Figs. 4 and 5 are views in vertical cross-section through the control mechanism for removing packages at one selected station.

In Figs. 1-3 I have shown one convenient mechanism for loading balls into the conveyor belt 100 which is, of course, of any desired length and width and preferably made of rubberized canvas or the like. In its upper run the belt travels over the surface of a continuous steel supporting plate 102. The length of the belt and the number of holes in each group is determined by the number of discharge stations included in the system.

At the head or entering end of the system the plate 102 is provided with a group of holes in each of which is set a vertical metal tube 104. The tubes may be arranged in any convenient pattern provided no two are longitudinally aligned with respect to the direction of movement of the belt 100. Let into the side of each tube 104 is a downwardly inclined magazine tube 106 of the same diameter as the tube 104 and designed to accommodate a supply of steel balls 108. Sliding in each tube is a cylindrical plunger 110 having an exterior flange at its lower end, which works in an oversize tube 114 telescoped over the tube 104, and retractable downwardly until it meets a stop 116. In its lowermost position the plunger uncovers the end of the magazine tube 106 and permits one ball to roll out on top of the plunger. A compression spring 118 is seated in the tube 114 and serves to force the plunger upwardly. Fig. 1 shows a ball 108 in position on the plunger, the upper end of the tube 104 then being closed by the belt 100; the hole 140 has not yet reached loading position. In Fig. 2 the plunger has been released and the ball 108 carried up into contact with the moving belt. In Fig. 3 the hole 140 has come into registry with the end of the tube 104 and the ball has been thrust up into the hole. To prevent the balls 108 from popping through the belt holes, the plungers may be magnetized sufficiently to hold the balls in place until the onwardly moving belt sweeps them along over the plate 102.

Figure 16:
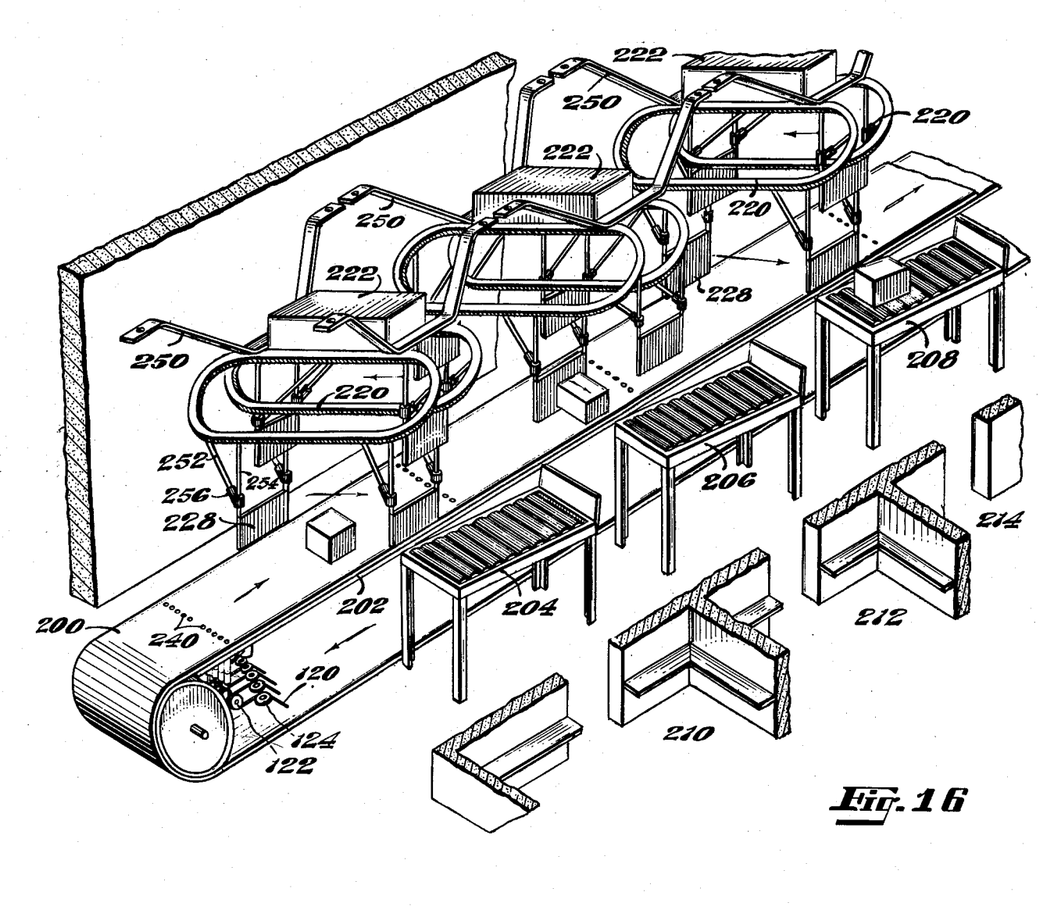
Fig. 16 is a view in perspective showing a sorting system constructed according to the invention and illustrating a third type of package remover.

To actuate the plungers 110 I provide cables 120 secured to the lower ends of the plungers and carried down around pulleys 122 and 124 (see Fig. 16). The other ends of the cables are secured to pivotally mounted levers (not shown) arranged in keyboard fashion at the side of the head of the belt run.

An operator located adjacent the keyboard will scan the addresses on the packages as they are put on to the belt. Then it is only necessary to operate the lever (which may be marked appropriately) to place a ball in the proper one of the holes 140. The holes may be located ahead or behind the package carrying space, and the spacing of the packages will of course be determined by their size.

Adjacent each discharge station the plate 102 is provided with a hole for a vertical tube 50 in the side of which is an aperture into which projects the arm 58 of a microswitch 60 supported on the side of the tube 50 by means of an angle bracket 64. Pivotally mounted in the wall of the tube 50 is a finger or shutter 62 normally inclined into the hollow tube 50 and in contact with the switch arm 58. As the packages travel along with the belt 100 the balls 108 begin to drop in their proper tubes 50. If at any one station no ball drops into the tube 50, that station is not activated. On the other hand, if a ball does drop into the tube, the package discharging mechanism is actuated to remove the package from the belt at that station. A succession of packages may be consecutively removed at one station or distributed among a number of them, all according to the location of the balls 108 in the successive spaced groups of holes 140.

Each microswitch 60 controls the operation of an independent package remover. Three types will hereinafter be described. First however an alternative ball carrier will be discussed, with reference to Figs. 6 and 7.

Figure 6:
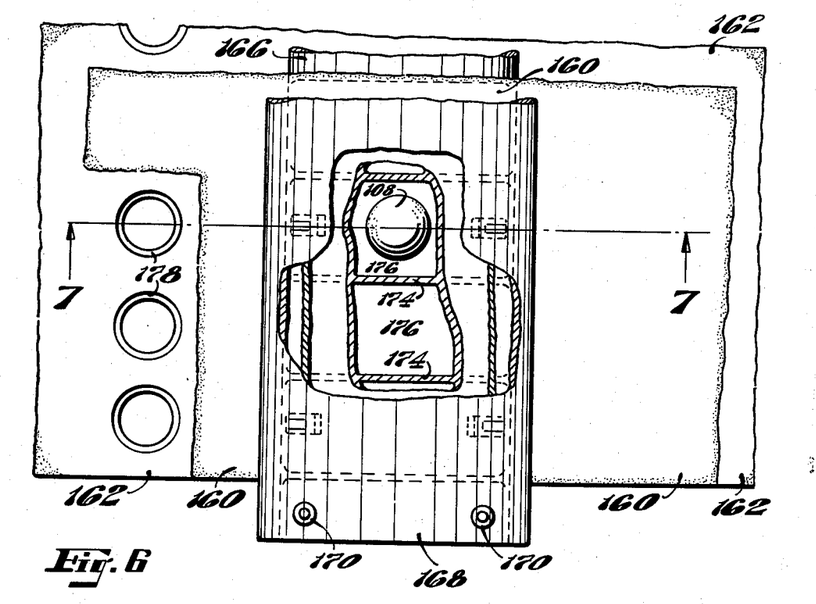
Fig. 6 is a plan view of an alternate form of ball-carrying device.

It may be felt that the belt 100 would be seriously weakened by the multiplicity of groups of holes. The ball carrier shown in Figs. 6 and 7 obviates the necessity for making holes in the belt. In this instance the belt 160 travels over a plate 162 having a hole 164 at each discharge station. At intervals the belt is crimped upwardly between two elongated arcuate members 166 and 168 riveted together as shown at 170 and corrugated or indented as shown at 172 to provide cooperating belt-gripping members. The lower arcuate member 166 is provided at spaced intervals with transverse walls or partitions 174 to provide a number of compartments 176 for the reception of the balls 108. Each ball compartment is centered with respect to the tubes set into the plate 162. In Fig. 6 the upper ends of the loading tubes at the head end of the belt are shown at 178.

Figure 7:
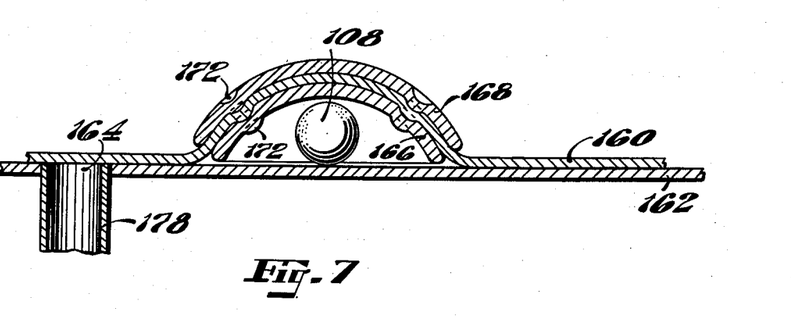
Fig. 7 is a view in cross-section along the line 7—7 of Fig. 6.

The operation of the system equipped with a carrier of the type shown in Figs. 6 and 7 is the same as heretofore explained, the only difference being that the balls 108 are loaded from the tubes into the compartments 176 where, as can best be seen in Fig. 7, they ride under the belt and roll easily along the surface of the plate until they drop into receiving tubes.

The first and preferred type of package removing mechanism is shown in Figs. 8-14 wherein it appears that the belt 300, riding on the plate 302, has a plurality of sets of tilting plates hingedly secured to it. Each tilting plate assembly includes a long flexible hinge member 304 secured to the upper surface of the belt in transverse position and formed of rubber, rubberized canvas or the like and having a flange portion cemented or otherwise secured to the margin of a base plate 306. The hinge may conveniently be secured to the upper arcuate plate 168 shown in Fig. 7. The base plate is in turn secured along a longitudinal margin at right angles to the hinge 304 to one element of a long hinge 308 which joins the base plate 306 to an upper plate 310, the plates 306 and 310 being recessed to accommodate the hinge members.

Figure 8:
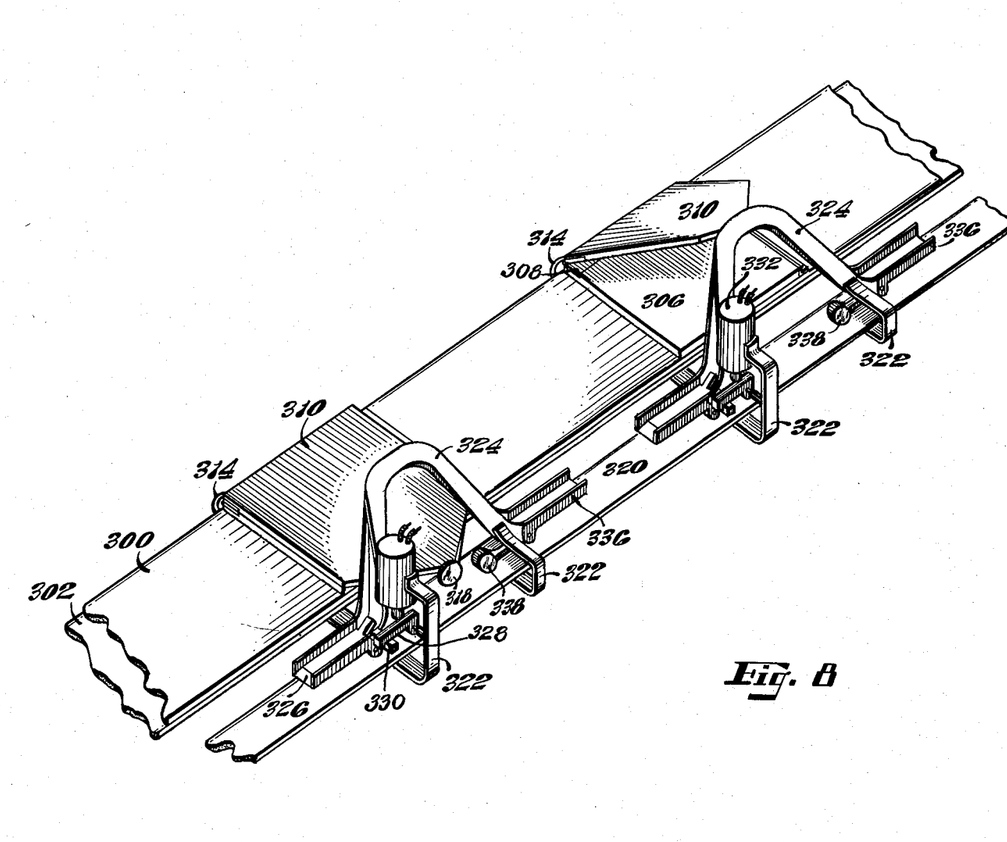
Fig. 8 is a view in perspective showing the preferred form of package removing device.
Figures 9, 10, 11:
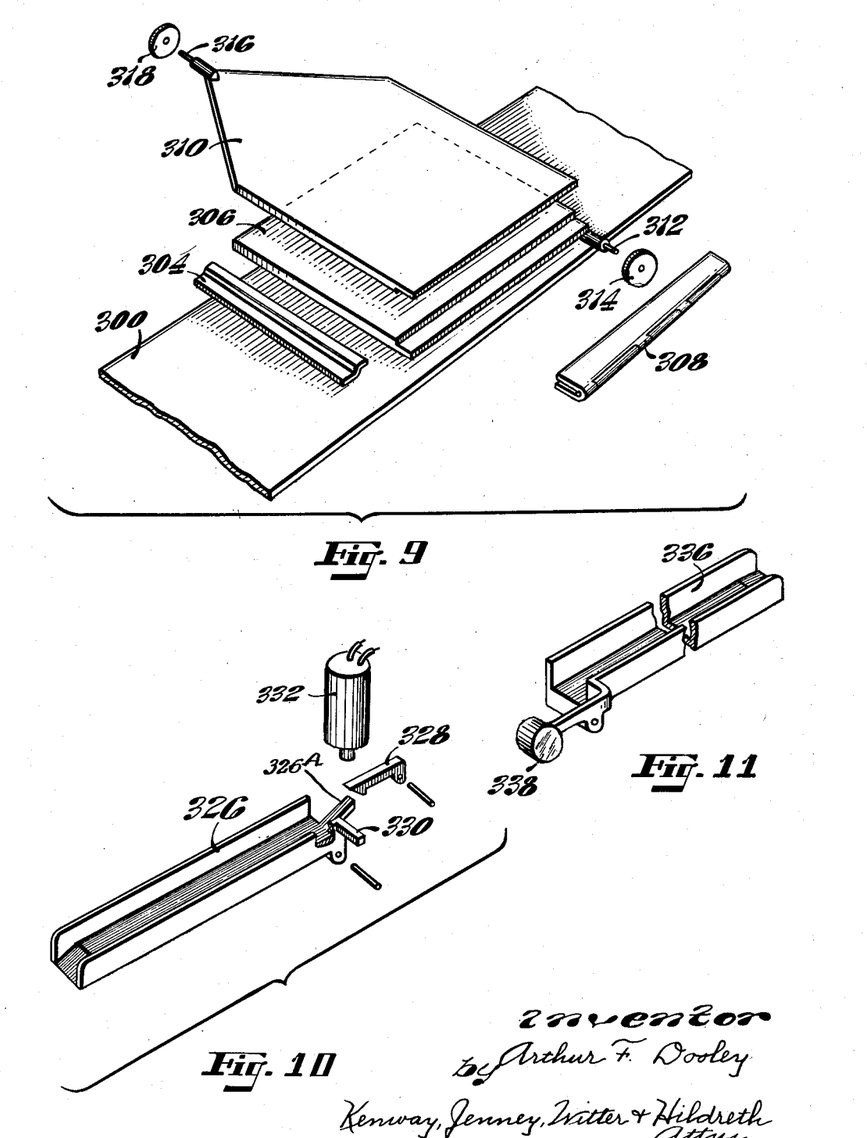
Figs. 9-11 are exploded views in perspective of elements of the package-removing system shown in Fig. 8, Figs. 12 and 13 are side elevations of the two ends of the conveyor system.

A stud 312 secured to one corner of the base plate 306 carries a freely turning roller 314, and a stud 316 secured to the upper plate 310 at the other side of the belt carries a freely turning roller 318.

Secured closely parallel the plate 302 and underlying the rollers 318 is a flat plate or track member 320 along which the rollers 318 travel as the belt moves. At spaced positions along the track 320 are plate lifts secured in place by suitable brackets 322 and each comprising an upwardly and inwardly inclined guide track 324 to the forward end of which is secured a short pivotally mounted track section 326. A latch 328 normally engages a projecting stop 330 on the member 326 and serves to hold the latter in elevated position sufficiently high to clear the successive rollers 318 as they travel over the plate 320. A solenoid 332 is poised over the latch 328 and serves, when energized, to release the latch and permit the track section 326 to pivot downwardly to rest at its end on the track 320. The lowered section engages an oncoming roller 318 and causes it to travel up the inclined track 324 and then back down again. During this operation the upper plate 310 is pivoted upwardly about the hinge 308 to the position shown at the second station in Fig. 8. The inclination of the plate 310 is sufficient to cause any package placed thereon to slide off into a receiving chute (not shown in Fig. 8). As the roller 318 travels up the pivoting track section 326 it encounters an upwardly inclined finger 326A, shown best in Fig. 10, and forces the track 326 to return to its latched position so that the latch 328 again engages the stop 330 and the section 326 is held in elevated position until such time as the solenoid 332 is again energized. As before, the solenoid is controlled by a microswitch which in turn is controlled by an actuating finger operated by one of the balls 108 as shown in Figs. 4 and 5.

At the rear end of the track 324 is another pivoted track section 336 with which is integrally formed a counterweight 338 so dimensioned as normally to hold the track section 336 in horizontal elevated position. When a roller 318 travels down the rear portion of the track 324, it rolls onto the pivoting section 336 which then is lowered by the weight of the roller so that the roller travels down it and back to the surface of the long plate 320. When the roller 318 leaves the far end of the track 336, the counterweight 338 is effective to restore this section to horizontal elevated position.

Figure 12:
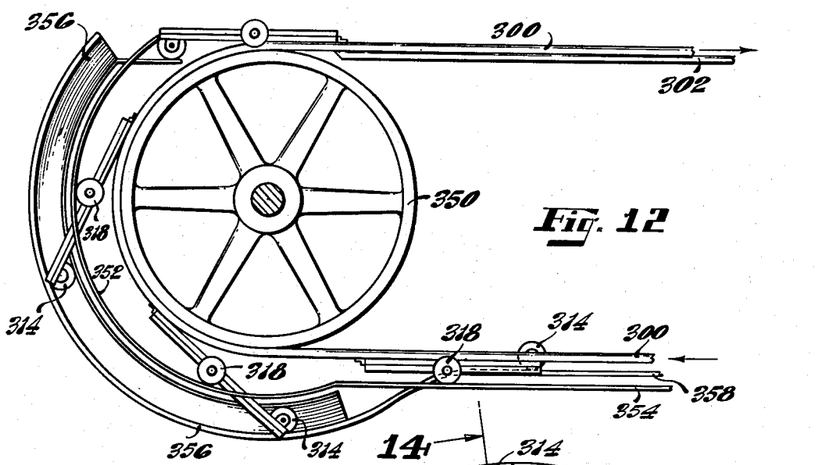
Figures 13, 14:
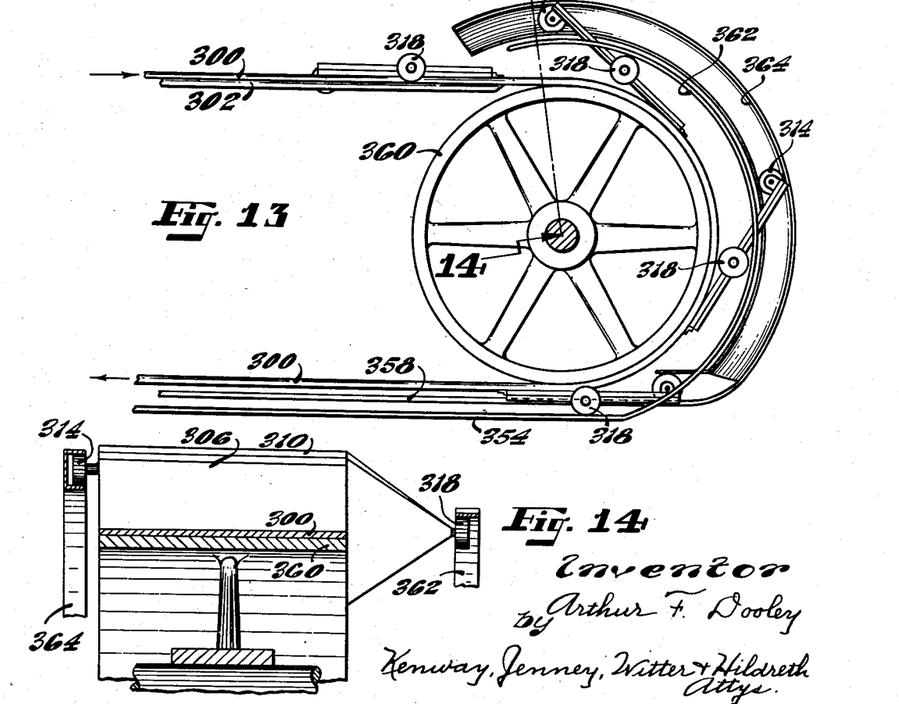

In order to provide for smooth travel of the tilting plate assembly over the ends of the conveyor belt runs I employ the arcuate guide tracks shown in Figs. 12 and 13. Fig. 12 shows the head end of the conveyor system with the belt 300 traveling over the plate 302 after leaving the surface of a large wheel 350. At one side of the wheel 350 there is provided an arcuate guide track 352, in which travels the successive rollers 318, merging into a straight track 354 running completely along the lower run of the conveyor. At the opposite side of the wheel there is a second arcuate track 356 of larger diameter than that of the track 352. The track 356 serves as a guide for the rollers 314. The track 356 also merges into a straight track 358 running the entire length of the conveyor. It will be seen that the straight tracks 354 and 358 serve to hold the plates 310 and 306 flat on the belt 300 as it travels along its lower run; then when a plate assembly approaches the forward end of the conveyor at the bottom thereof, the roller 318 enters the track 352 while the roller 314 enters the track 356. As the belt travels around the wheel 350 both plates 306 and 310 hinge about the member 304 and drop away from the surface of the belt 300. This action permits the belt to flex into the curve of the wheel while the arcuate tracks 352 and 354 guide the rollers and thus the plates in smooth fashion. At the top of the wheel the tracks 352 and 356 are discontinued because gravity then brings both plates 306 and 310 in flat condition upon the belt 300. A similar arrangement is shown at Fig. 13 at the rear end of the conveyor, where the belt travels over a wheel 360, there being provided an arcuate track 362 for the rollers 318 and a larger diameter arcuate track 364 for the rollers 314. At their lower ends the tracks 362 and 364 merge respectively into the straight bottom tracks 354 and 358.

Although in Figs. 8–14 the plate assemblies have been shown as relatively widely spaced, in practice it will be found advisable to space them very closely in order that the maximum area of the belt be usefully employed. The operation of the balls which control the package discharge means and as described in connection with Figs. 1–5 is, of course, applicable to the system shown in Figs. 8–14.

Figure 15:
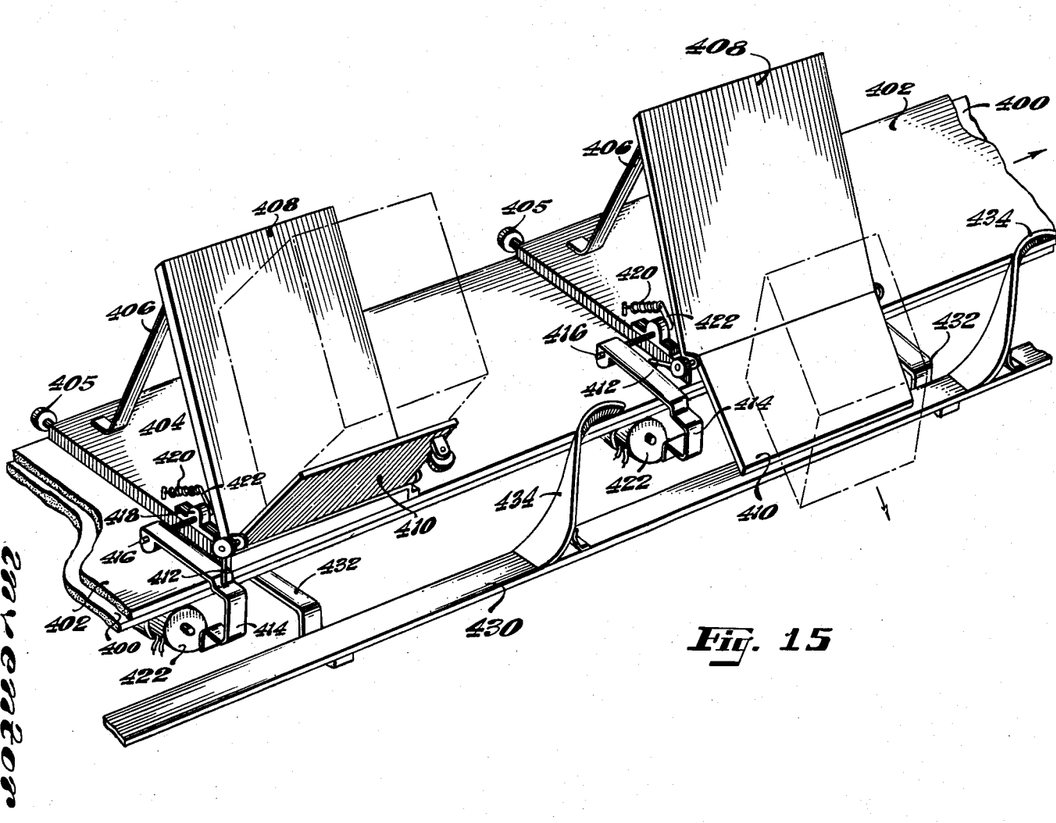
Fig. 15 is a view in perspective showing a second type of package remover.

In Fig. 15 I have shown a second form of mechanism for removing packages or other objects from the conveyor belt at desired locations. As before, there is provided a plate 400 over which travels a conveyor belt 402. Permanently secured to the belt at spaced intervals is a base plate 404 supporting an inclined bracket 406 which in turn supports an inclined plate 408. Hinged to the bottom of the inclined plate 408 is a tailboard 410 normally held in upwardly inclined position, as shown at the first station in Fig. 15, by means of a latch 412 secured to a stud extending from the rear inside corner of the tailgate. A keeper 414 is pivotally mounted on a stud 416 rotating in a lug 418 mounted on the base plate 404. A spring 420 secured at one end to the base plate 404 is secured at its other end to a finger 422 fastened to the inner end of the stud 416 and serves to hold the keeper 414 in elevated position in which it engages the latch 412 and thus serves to hold the tail gate in upper or closed position. A solenoid 422 is mounted beneath the plate 400 adjacent each discharge location and, when energized, acts to draw the keeper 414 downwardly to release the latch 412 and let the tail gate swing out and down to the position shown in the second station in Fig. 15. A long strip of metal 430 is supported by brackets 432 parallel and closely adjacent the plate 400. In advance of the location of each of the solenoids 422 there is provided an inwardly and upwardly inclined guide 434 which serves to engage any oncoming tail gate which is in lowered position and raise it again until the latch 412 engages the keeper.

In operation the packages reaching the conveyor are placed upon the inclined plates 408 and held there by the tail gates. Each package thereafter travels along on the conveyor until such time as the appropriate solenoid is energized and the tail gate released. Thereupon the package slides off the plate 408 and into a receiving chute (not shown in Fig. 15). The energization of the solenoids 422 is carried out selectively in the manner exactly as described in conjunction with Figs. 1–5.

Figure 17:
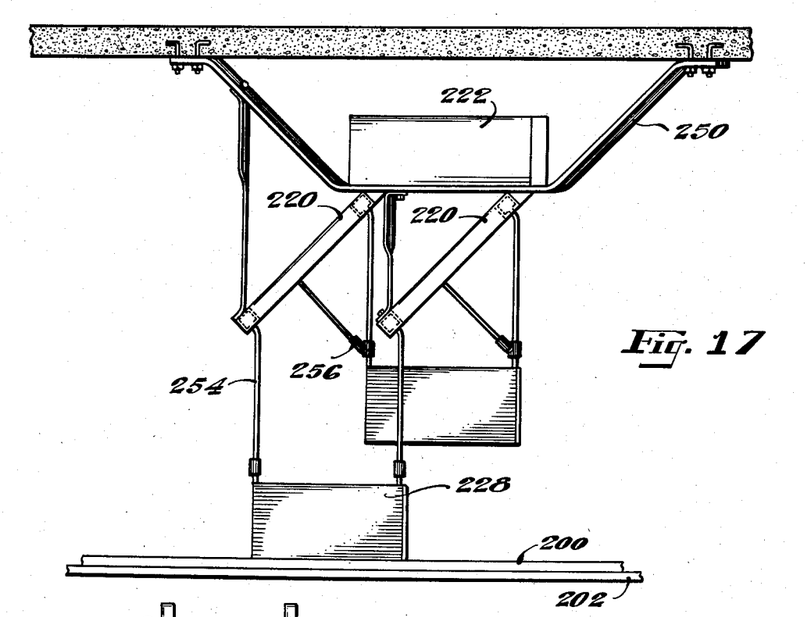
Fig. 17 is a view in end elevation of the remover shown in Fig. 16.
Figure 18:
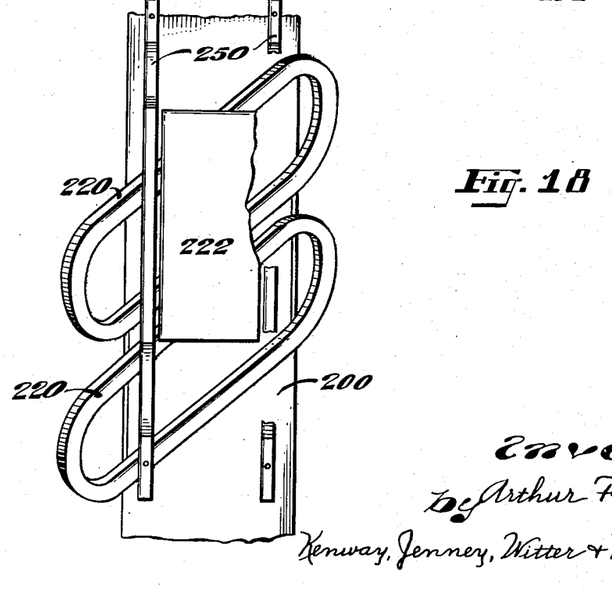
Fig. 18 is a plan view of the package remover shown in Figs. 16 and 17.

In Figs. 16–18 I have shown a third embodiment of a package removing mechanism. Inasmuch as this has previously been described in general, it will here be necessary merely to describe the sweeps and their drives. I provide for each package remover a pair of substantially U-shaped ceiling brackets 250 adapted to be bolted to the ceiling of the room in which the conveyor is located. Each pair of brackets 250 supports a drive unit housed in a rectangular casing 222, as well as a pair of horizontally and vertically inclined track members 220 in which there is contained an endless chain (not shown). The endless chains are driven in synchronism and support at intervals pairs of depending rods 252 and 254, each of these pairs of rods being matched by an opposing pair depending from the other chain and joined at the bottom by swivel joints 256. Each set of pairs of the depending rods carries a flat sweep or paddle 228 positioned to move across and along the top of the belt 200. The direction of movement of the sweeps is at an angle with respect to the belt so that each sweep moves across the belt and with the belt. Each time a ball puts the power unit 222 into operation, the chains are advanced by an amount sufficient to move one sweep entirely across the belt and then stop. During this movement any package intercepted by the sweep will be pushed off the belt and into one of the receiving chutes 204, 206 and 208. The details of the endless chains and their drive have not been illustrated because, per se, they form no part of my invention and are in fact standard equipment manufactured by several different companies and illustrated, for example, in catalogue No. A–83 of the Richards-Wilcox Mfg. Co., Aurora, Illinois.

In summation, it will be evident that I have invented a sorting conveyor in which the belt is never stopped, thus facilitating rapid and efficient operation. Moreover since each object to be sorted is accompanied by one of the balls appropriately placed, the operation of the package removing mechanism is independent of the speed of the belt. If for some reason the belt is stopped while packages are upon it, no harm is done since the packages will be discharged at the proper location when the belt is again started up. When it is considered that in connection with ordinary conveyors used for sorting purposes by large retail establishments, for example, as many as thirty-one persons are employed in scanning the oncoming packages and removing them at the various stations, the importance of my invention will readily be understood. Whereas heretofore each sorting station has required a separate operator, a single person may serve several stations in my system, moving periodically from one to another to remove accumulated packages from the receiving chutes and place them into the delivery bins.

Although I have illustrated systems in which all objects are discharged on the same side of the conveyor belt, it is quite feasible, by obvious modifications, to secure discharge on both sides. Also it will be apparent that the balls may be loaded by hand in the conveyor belt if for any reason such procedure is preferred.

Having thus disclosed by invention what I claim as new and desire to secure by Letters Patent of the United States is:

1. A sorting conveyor comprising a single endless package-carrying belt, a plate supporting one run of said belt, a plurality of package discharging means associated with said belt, an actuating switch operatively connected with each of said discharging means, said plate having a hole at the location of each of said discharging means, said holes being laterally offset with respect to each other, a plurality of spaced rows of holes in said belt, each of said switches having a control member disposed beneath one of said holes in said plate, whereby a missile may be placed in a selected one of said belt holes to travel across said plate until it encounters a predetermined one of said holes in said plate and thereupon drop upon and actuate one of said switch control members.

2. A sorting conveyor, comprising an endless object-carrying belt, means mounting the belt for continuous movement, a plate supporting one run of the belt, said belt having a plurality of groups of holes, a plurality of independent means for removing objects from said belt at spaced positions along said run, a trip finger controlling each of said removing means, said fingers being disposed at spaced positions underlying said plate, said plate having an opening overlying each trip finger, a plurality of vertical tubes disposed beneath said belt and communicating with holes in said plate, and means for ejecting a ball from a selected tube through a hole in said plate and into a hole in said belt, whereby said ball will be carried by said belt to an opening in said plate overlying a trip finger, said opening being sufficiently large to permit the ball to pass therethrough, whereby said ball trips said finger to actuate said object removing means.

3. In a conveyor system including an endless conveyor belt and a plurality of package removers for removing packages from said belt, the combination of a plate supporting one run of said belt, a plurality of tubes mounted beneath holes formed in said plate, a switch mounted adjacent each tube, and a switch-actuating finger disposed within each of said tubes, means for actuating said fingers, each of said switches being connected to control one of said package removers, said belt having a plurality of groups of holes for carrying the finger actuating means, one hole of each group being longitudinally aligned with one of said tubes, whereby a finger actuating means may be carried by said belt to a longitudinally aligned tube to actuate the finger within said tube.

4. In a conveyor system including a conveyor belt, the combination of an elongated plate, a group of loading tubes disposed transversely beneath said plate at one location and communicating with holes formed in said plate, a plurality of receiving tubes mounted beneath single spaced holes in said plate, means including a magnetic plunger disposed in each of said loading tubes for selectively ejecting a series of steel balls from each of said loading tubes to the surface of said plate, a switch mounted adjacent each receiving tube, a switch-actuating finger disposed in each of said receiving tubes adapted to be actuated by one of said steel balls, each receiving tube being aligned longitudinally at said plate with but one of said loading tubes and means operatively associated with said conveyor belt for transporting said steel balls from the holes in said plate communicating with loading tubes to the respective longitudinally aligned holes in the plate communicating with the receiving tubes.

ARTHUR F. DOOLEY.

References Cited in the file of this patent

UNITED STATES PATENTS

| Number | Name | Date |
|---|---|---|
| 1,225,586 | Cowley | May 8, 1917 |
| 1,244,546 | Rottenburg | Oct. 30, 1917 |
| 1,876,252 | Lehman | Sept. 6, 1932 |
| 1,924,146 | Almgren | Aug. 29, 1933 |
| 1,946,980 | Loomis | Feb. 13, 1934 |
| 1,962,745 | Larsen et al. | June 12, 1934 |
| 2,011,827 | Regan | Aug. 20, 1935 |
| 2,310,461 | Regan et al. | Feb. 9, 1943 |
| 2,315,659 | Russell | Apr. 6, 1943 |
| 2,490,071 | Mackechnie | Dec. 6, 1949 |